(12) United States Patent
Sharawi et al.

(10) Patent No.: US 8,907,846 B2
(45) Date of Patent: Dec. 9, 2014

(54) SINGLE-ANTENNA DIRECTION FINDING SYSTEM FOR MULTI-ROTOR PLATFORMS

(71) Applicant: King Fahd University of Petroleum and Minerals, Dhahran (SA)

(72) Inventors: Mohammad S. Sharawi, Dhahran (SA); Belal H. Sababha, Amman (JO); Hamzeh M. Alzu'bi, Amman (JO); Osamah Ahmad Rawashdeh, Rochester Hills, MI (US)

(73) Assignee: King Fahd University of Petroleum and Minerals, Dhahran (SA)

( * ) Notice: Subject to any disclaimer, the term of this patent is extended or adjusted under 35 U.S.C. 154(b) by 201 days.

(21) Appl. No.: 13/760,019

(22) Filed: Feb. 5, 2013

(65) Prior Publication Data

US 2014/0218239 A1 Aug. 7, 2014

(51) Int. Cl.
*G01S 5/02* (2010.01)
*G01S 3/38* (2006.01)
*G05D 1/08* (2006.01)

(52) U.S. Cl.
CPC .... *G01S 3/38* (2013.01); *G05D 1/08* (2013.01)
USPC .............................................. 342/422; 701/4

(58) Field of Classification Search
USPC .................... 701/4; 342/422, 393; 455/456.1; 244/23 A, 35 R, 190, 62, 194, 189, 12.2, 244/6, 13, 17.11, 133; 354/393
See application file for complete search history.

(56) References Cited

U.S. PATENT DOCUMENTS

| | | | | |
|---|---|---|---|---|
| 5,575,438 A | * | 11/1996 | McGonigle et al. | 244/13 |
| 6,065,718 A | * | 5/2000 | Piasecki | 244/17.11 |
| 6,170,778 B1 | * | 1/2001 | Cycon et al. | 244/6 |
| 6,270,038 B1 | * | 8/2001 | Cycon et al. | 244/12.3 |
| 6,431,494 B1 | * | 8/2002 | Kinkead et al. | 244/76 B |
| 6,478,262 B1 | * | 11/2002 | Kinkead et al. | 244/195 |
| 6,592,071 B2 | * | 7/2003 | Kinkead et al. | 244/7 R |
| 6,691,949 B2 | * | 2/2004 | Plump et al. | 244/12.2 |
| 7,931,239 B2 | * | 4/2011 | Pedersen et al. | 244/189 |
| 8,249,618 B2 | * | 8/2012 | Fireaizen | 455/456.1 |
| 8,328,130 B2 | * | 12/2012 | Goossen | 244/23 A |
| 2003/0057331 A1 | * | 3/2003 | Kinkead et al. | 244/194 |
| 2006/0144994 A1 | * | 7/2006 | Spirov et al. | 244/62 |
| 2008/0223993 A1 | * | 9/2008 | Spirov et al. | 244/23 A |
| 2009/0111483 A1 | * | 4/2009 | Fiereizen | 455/456.1 |
| 2010/0140415 A1 | * | 6/2010 | Goossen | 244/23 A |
| 2011/0204187 A1 | * | 8/2011 | Spirov et al. | 244/190 |
| 2012/0292441 A1 | * | 11/2012 | Drela et al. | 244/1 N |
| 2014/0197280 A1 | * | 7/2014 | Smith et al. | 244/35 R |

FOREIGN PATENT DOCUMENTS

CN 201285418 Y 8/2009

* cited by examiner

*Primary Examiner* — Thomas G Black
*Assistant Examiner* — Robert Payne
(74) *Attorney, Agent, or Firm* — Richard C. Litman (57) ABSTRACT

The single-antenna radio frequency (RF), direction finding (DF) system includes a single-element directional antenna, which is mounted on a multi-rotor UAV (Unmanned Aerial Vehicle) and integrates with a DF algorithm for tracking an RF source in the 2.45 GHz ISM band (or any other frequency band). The algorithm will depend on the rotating nature of the platform to scan the azimuth, as well as several elevation angles with respect to the platform axis of rotation, and thus be able to accurately locate the coordinates of the RF transmitter based on the recorded power levels. The RF source determination step is performed during the search mode of the algorithm. The RF transmitter location is saved, and the UAV takes actions accordingly by commencing movement towards that location in the action mode of the algorithm. After some time, the UAV enters the search mode again in case the RF source has moved.

8 Claims, 10 Drawing Sheets

SINGLE-ANTENNA DIRECTION FINDING SYSTEM FOR MULTI-ROTOR PLATFORMS

BACKGROUND OF THE INVENTION

1. Field of the Invention

The present invention relates to radio frequency direction finding systems, and particularly to a single-antenna direction finding system for multi-rotor platforms.

2. Description of the Related Art

Radio frequency (RF) direction finding (DF) systems are used to detect the presence of a desired/undesired RF signal transmitter location. In early systems, this process involved mechanically rotating the directional antenna across the 360° azimuth plane to find the most probable direction of the RF transmission. If the transmitted signal duration is long enough, its position can be located quite accurately.

The majority of the initial RF DF antenna systems used multiple channel receiver systems, where every antenna element on the antenna array had a corresponding receiver. These systems were bulky and consumed too much power, and in some cases, were impractical due to mobility related issues. Recent advances in integrated chip (IC) and digital signal processing (DSP) technologies have given rise to small, portable, and highly versatile single channel DF systems. In order to accurately determine the position of the object in the far field of the antenna, it is desired to have a high gain (in the desired plane) and extremely narrow half-power beam widths (HPBW). Moreover, the scanning angle can be increased by modifying the geometry of the antenna array. Circular antenna arrays are an example of antenna arrays with a 360° scan angle. The selection of the antenna elements constituting the array is made on the basis of the individual radiation characteristics of the respective element types.

For high accuracy, we desire antenna elements that have narrow HPBW and high gains. Although several antenna array designs have been investigated in literature; none have actually been integrated within a multi-rotor UAV (Unmanned Aerial Vehicle) platform with a DF algorithm.

Thus, a single-antenna direction finding system for multi-rotor platforms solving the aforementioned problems is desired.

SUMMARY OF THE INVENTION

The single-antenna direction finding system includes a single element directional antenna which mounts on a multi-rotor UAV (Unmanned Aerial Vehicle) and integrates with the DF (direction finding) algorithm for tracking an RF (radio frequency) source in the 2.45 GHz ISM band (or any other frequency band). The algorithm will depend on the rotating nature of the platform to scan the azimuth, as well as several elevation angles with respect to the platform axis of rotation, and thus be able to accurately locate the coordinates of the RF transmitter based on the recorded power levels. The RF source determination step is performed during the search mode of the algorithm. The RF transmitter location is saved, and the UAV takes actions accordingly by commencing movement towards that location in the action mode of the algorithm. After some time, the UAV enters the search mode again in case the RF source has moved.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
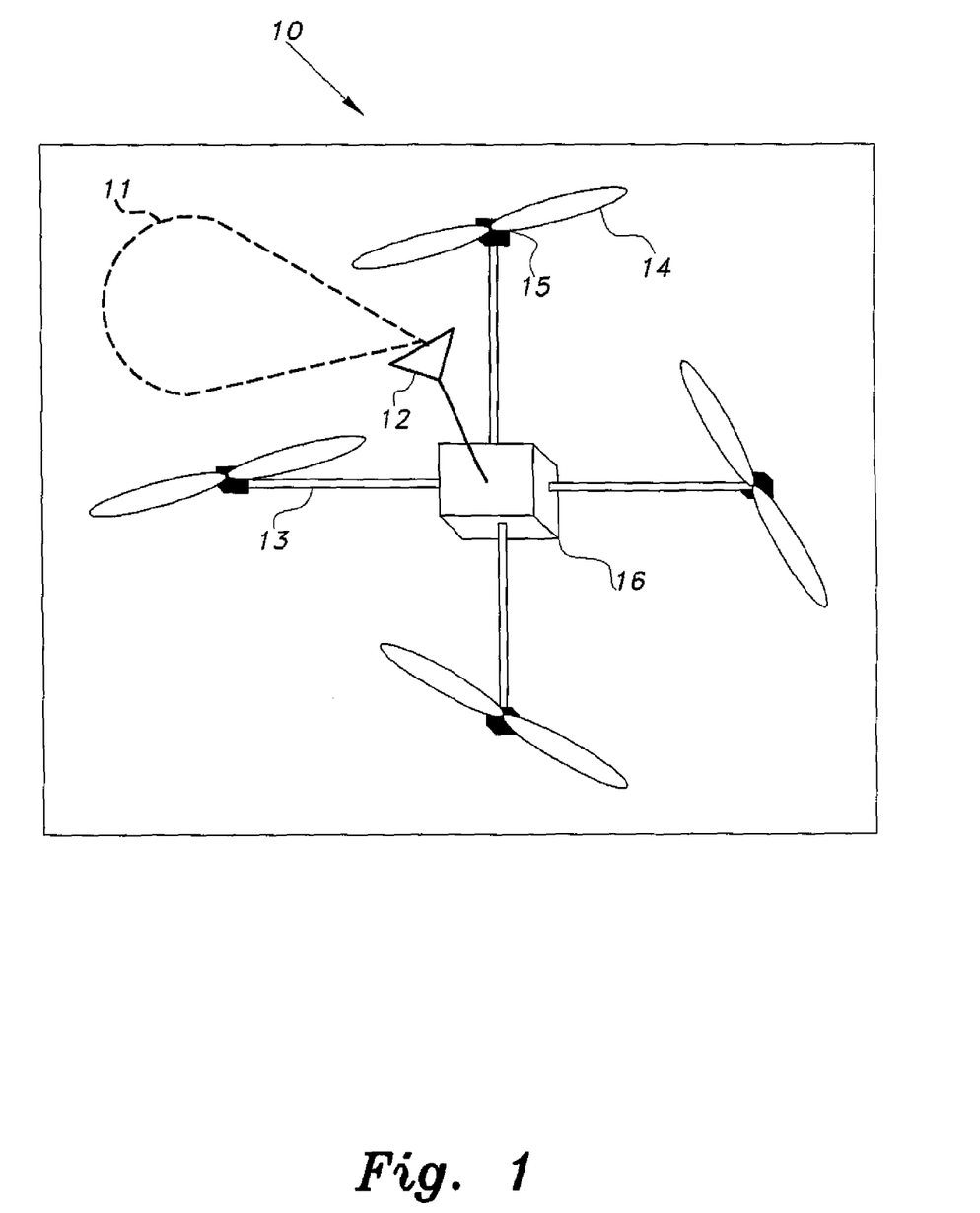
FIG. 1 is a perspective view of an exemplary robotic single-antenna direction finding system for multi-rotor platforms according to the present invention.

As shown in FIG. 1, the single-antenna direction finding system 10 for multi-rotor platforms includes a multi-rotor platform that has four structural arms 13 extending therefrom and a rotor attached to each arm 13, thereby forming a quad-rotor UAV (Unmanned Aerial Vehicle). Control electronics 16 are operably connected to the quad-rotor. A motor 15 and a propeller 14 are mounted at the end of each of these arms 13. The control electronics 16 will control the speed rates of the various motors 15 to cause the movement of the quad-rotor platform. A special control circuit is integrated within the control electronics 16 to perform the RF DF task. In addition, a special directive antenna 12 with a relatively narrow half-power-beam-width (HPBW) 11 is to be used for this task.

Figure 2A:
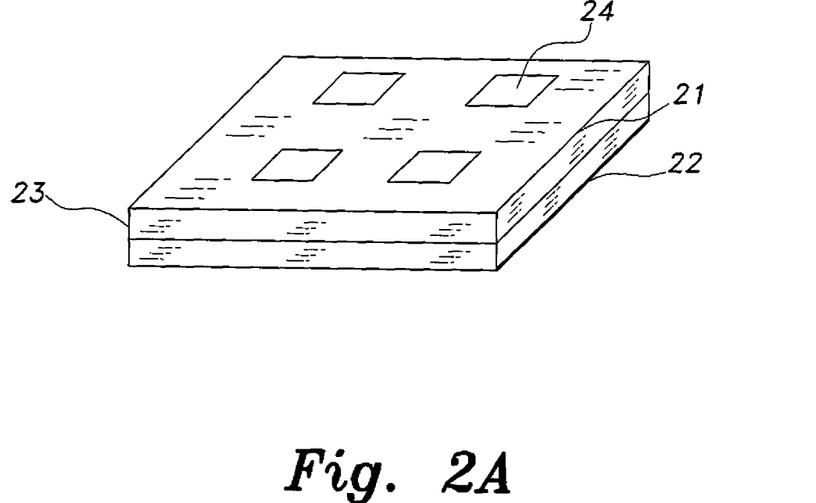
FIG. 2A is a perspective view of a circuit portion of the system of FIG. 1.
Figure 2B:
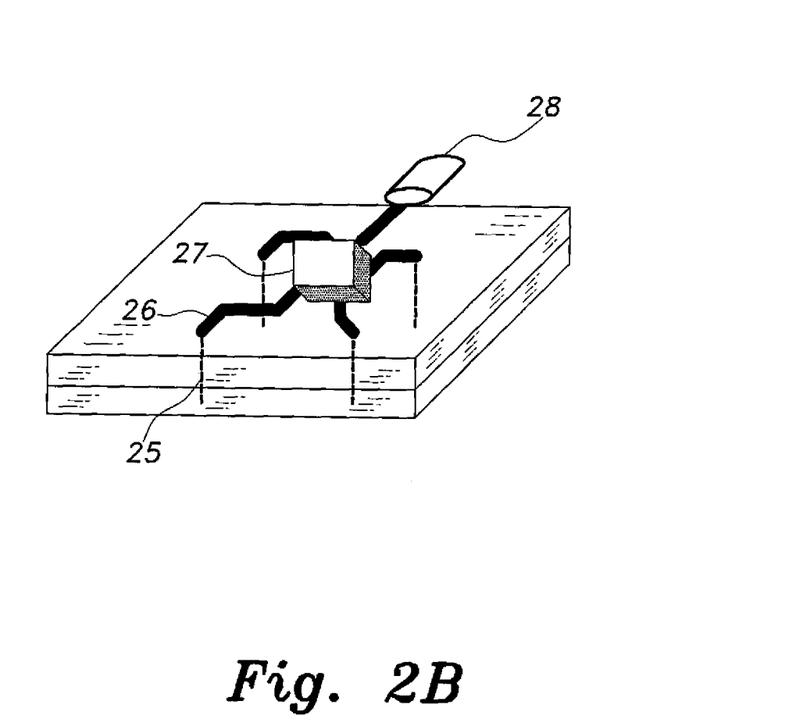
FIG. 2B is a perspective view of the circuit portion of FIG. 2A, showing antenna connection details.

The detailed structure of the single directive antenna is shown in FIGS. 2A and 2B. An exemplary antenna internal structure includes 4-element planar antenna array comprised of printed patch antenna elements 24. The array is fabricated on a dielectric substrate, and the patches are placed on its top layer 21, which is part of a printed circuit board (PCB). The middle layer of this PCB is filled with copper (metal) to act as a ground plane 23. The bottom layer 22 is the layer where the feed network is placed. FIG. 2A shows the top layer elements and the stackup of the PCB. FIG. 2B shows the bottom layer components. The feed network for the patch element planar array consists of elements 25 that extend from the bottom layer 22 to the top layer 21 to feed the patches in a probe-feed mechanism. The elements 25 are connected to the RF combiner circuit via microstrip traces 26 having 50 Ω impedance. The solid-state 4-port RF combiner 27 distributes the summed output to an SMA connector 28, which is connected to the receiver board by RF coaxial cable, In addition, the solid-state combiner 27 may also include some attenuation values to have different amplitude excitations for the array, thus providing the designer the ability to control the directivity and side lobes of the array via the Dolf-Tschebyscheff distribution, for example. This will affect the HPBW of the directive antenna used.

Figure 3:
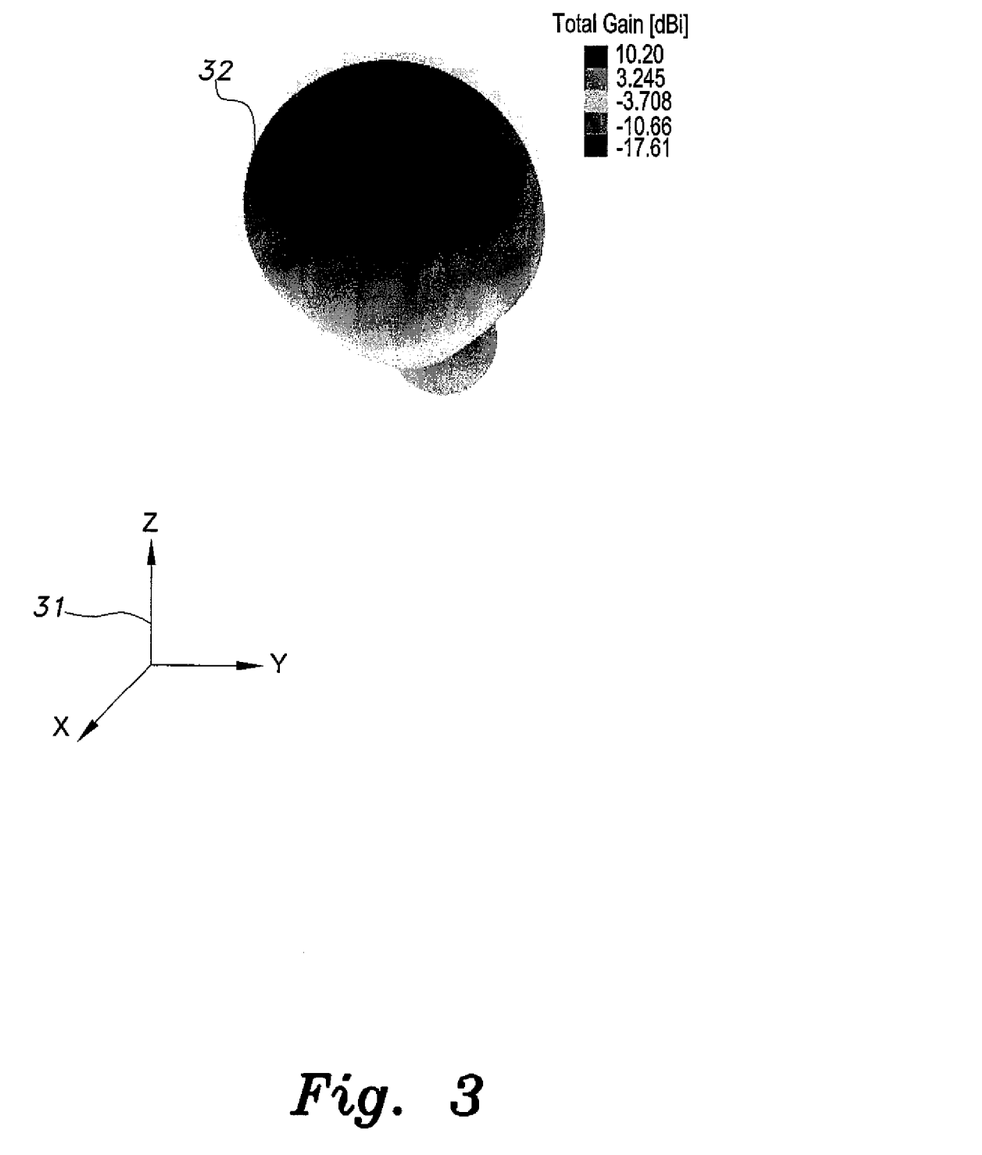
FIG. 3 shows a 3D gain pattern in a single-antenna direction finding system for multi-rotor platforms according to the present invention.
Figure 4A:
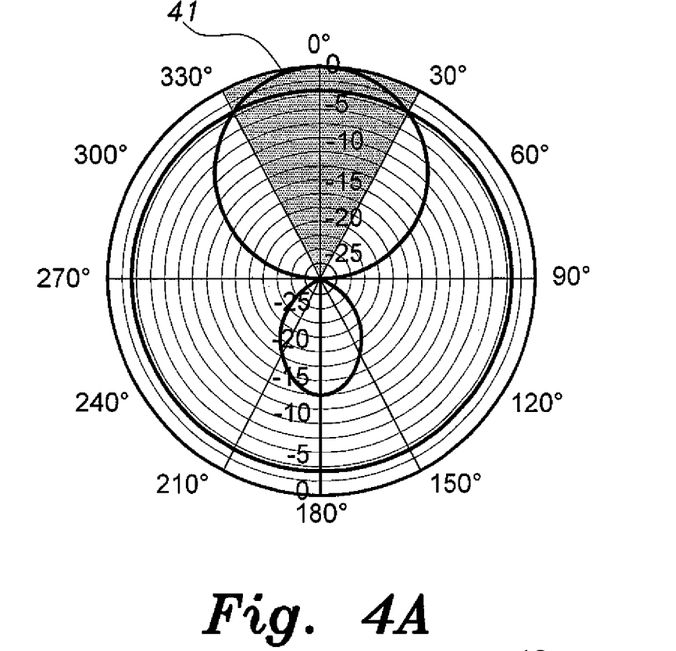
FIG. 4A is a plot showing an XZ plane HPBW 55° degree plot in a single-antenna direction finding system for multi-rotor platforms according to the present invention.
Figure 4B:
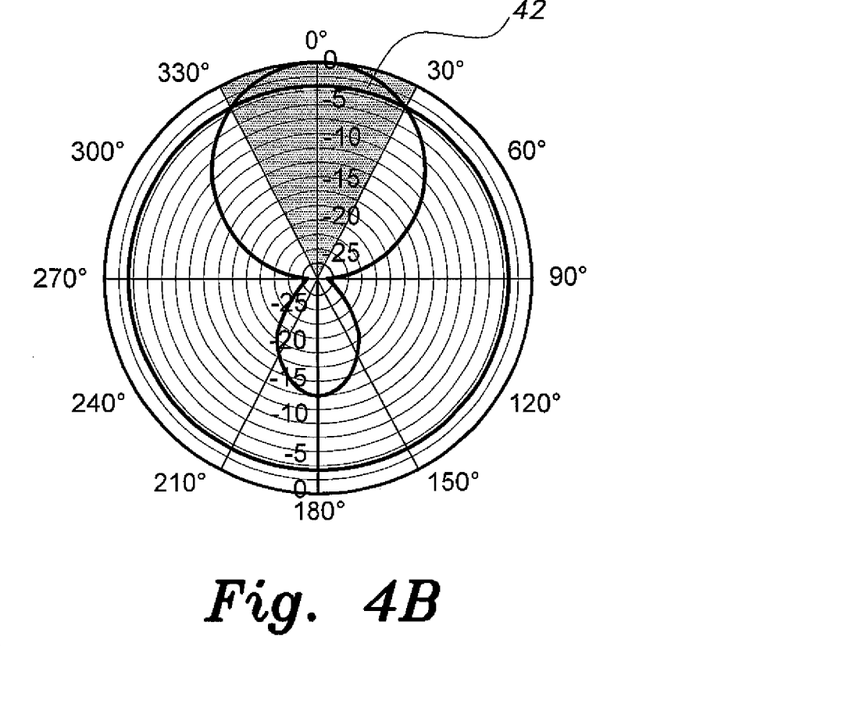
FIG. 4B is a plot showing an YZ plane HPBW 61° plot in a single-antenna direction finding system for multi-rotor platforms according to the present invention.

FIG. 3 shows the 3D gain pattern 32 obtained from the proposed directive antenna. Also, the coordinate system 31 is provided. The x-y plane is the plane where the patches are laying. Thus, the radiation from this array will be normal to the patch surfaces. FIG. 4A shows the x-z elevation plane cut 41 when the azimuth angle is zero degrees. The HPBW was approximately 55°. The elevation cut 42 at 90° azimuth (FIG. 4B) shows approximately 60°.

Figure 5A:
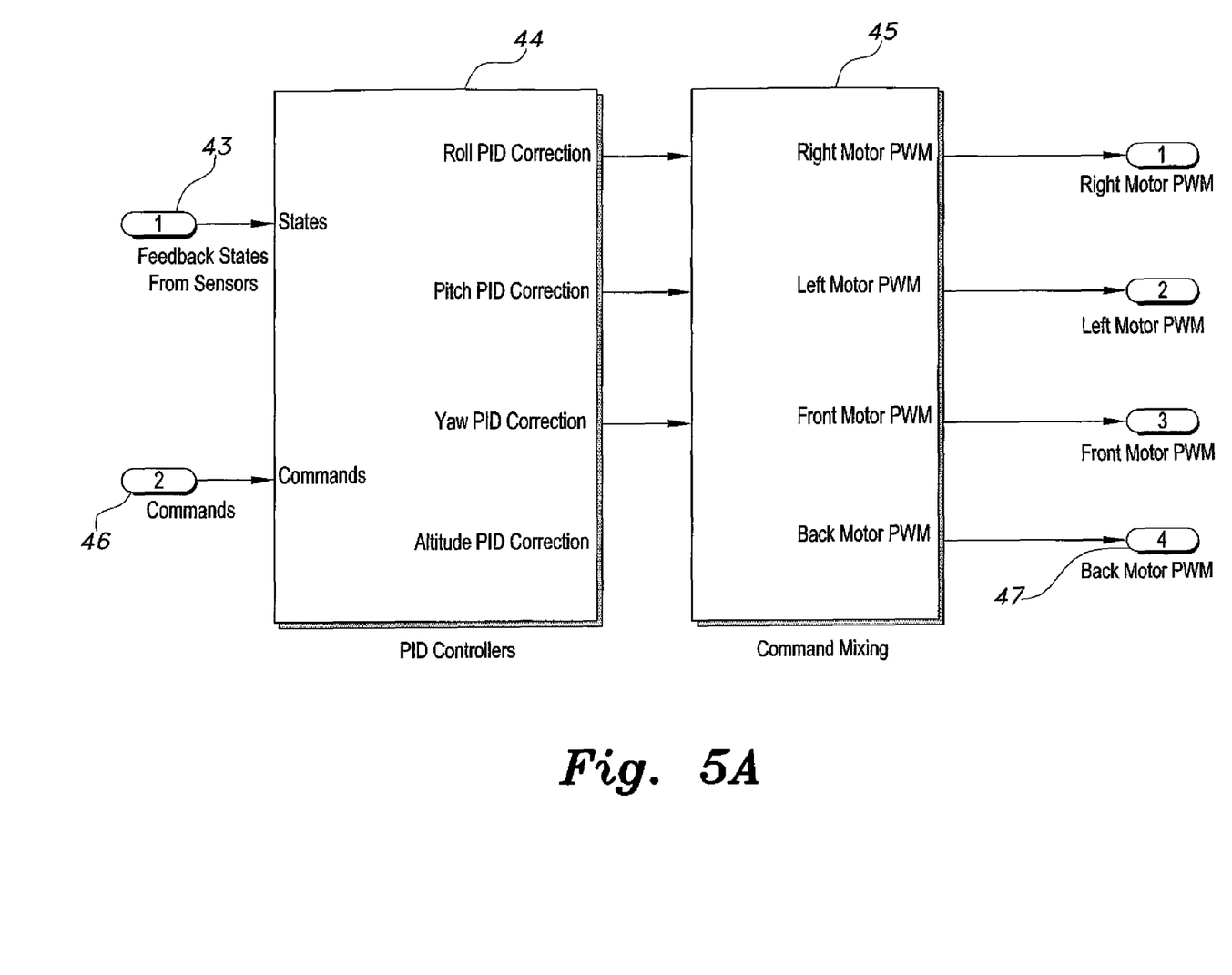
FIG. 5A is a block diagram of a single-antenna direction finding system for multi-rotor platforms according to the present invention, showing the PID controllers and command mixer.
Figure 5B:
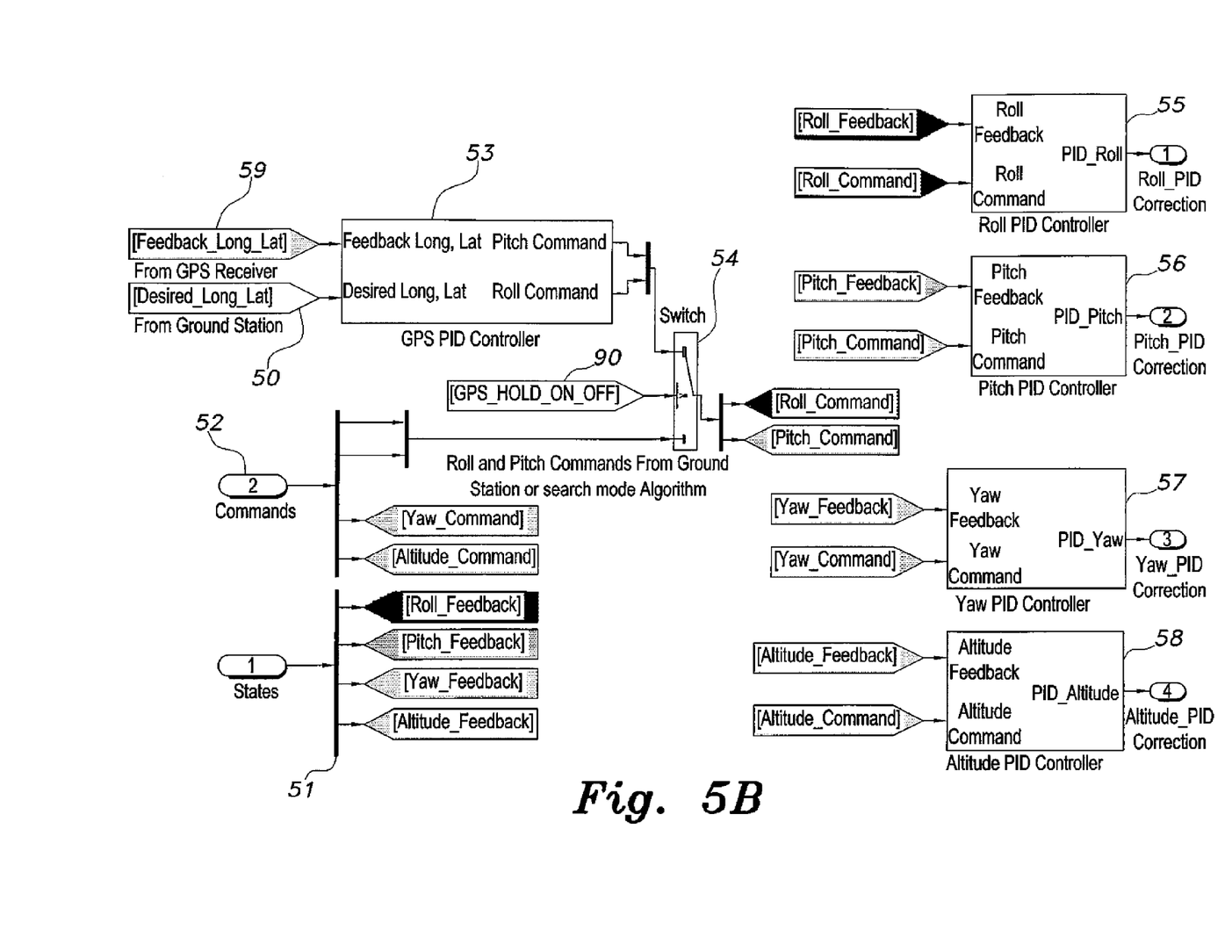
FIG. 5B is a block diagram of a single-antenna direction finding system for multi-rotor platforms according to the present invention, showing the feedback, command and states of the robotic antenna.

FIGS. 5A-5B show the control loops, (i.e., portions of the internal structure of control circuitry 16), of the quad-rotor UAV. In FIG. 5A, there are two main blocks, the PID (proportional-integral-derivative) Controllers block 44 and the Command Mixing block 45. The feedback states 43 are received from the gyros, accelerometers, ultrasonic, pressure, and GPS sensors that are on board the UAV electronics and control box 16. These are defined as the attitude and the position of the UAV. Commands 46 from the Ground Station or the search mode algorithm include the desired pitch, roll, and yaw angles and position. The PID controller block 44 calculates the difference between the feedback 43 and the reference 46 and tries to eliminate the error. The output of the controller 44 is mixed in block 45 to achieve all the desired PWM (pulse width modulation) commands 47 and send them to the motor controllers.

FIG. 5B illustrates the detailed attitude, altitude and GPS PID controllers. The Roll PID controller 55, the Pitch PID controller 56, the Yaw PID controller 57, and the Altitude PID controller 58 receive the desired and feedback Roll, Pitch, Yaw and Altitude signals from the ground station 52 (or the search mode algorithm) and the sensors 51, respectively. Each controller processes its inputs, and responsively outputs the control loop correction. The GPS control loop 53 receives the desired GPS longitude and latitude 50 from the ground station and its current longitude and latitude 59 from the GPS receiver, and according to the navigation algorithm, calculates the commands for pitch and roll. A switch 54 decides whether to use the command pitch and roll angles from the GPS PID controller 53 or from the pitch and roll angle commands coming from the search mode algorithm, depending on the GPS_HOLD_ON_OFF signal 90 coming from the search algorithm.

Figure 6A:
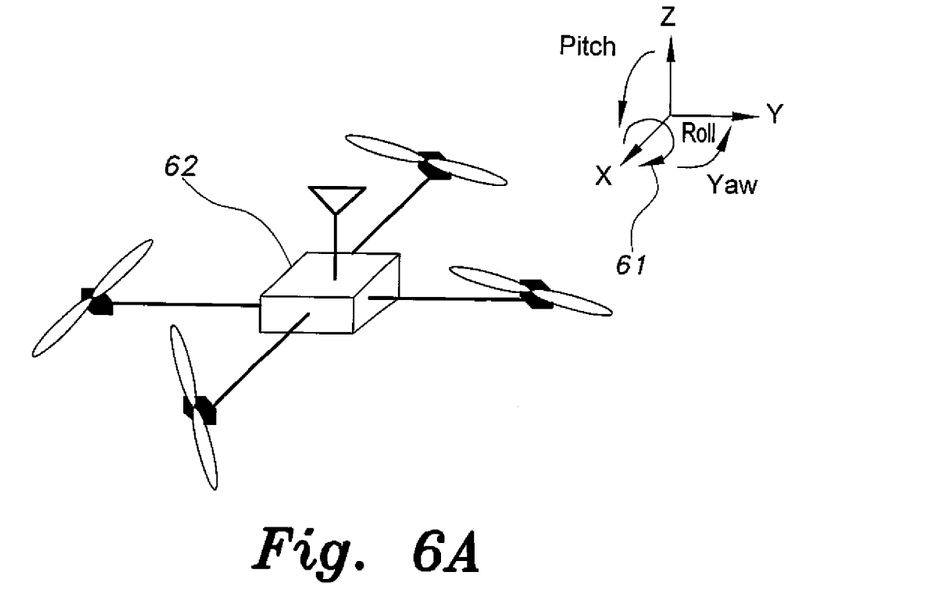
FIG. 6A shows a first orientation of the robotic antenna in a single-antenna direction finding system for multi-rotor platforms according to the present invention.
Figure 6B:
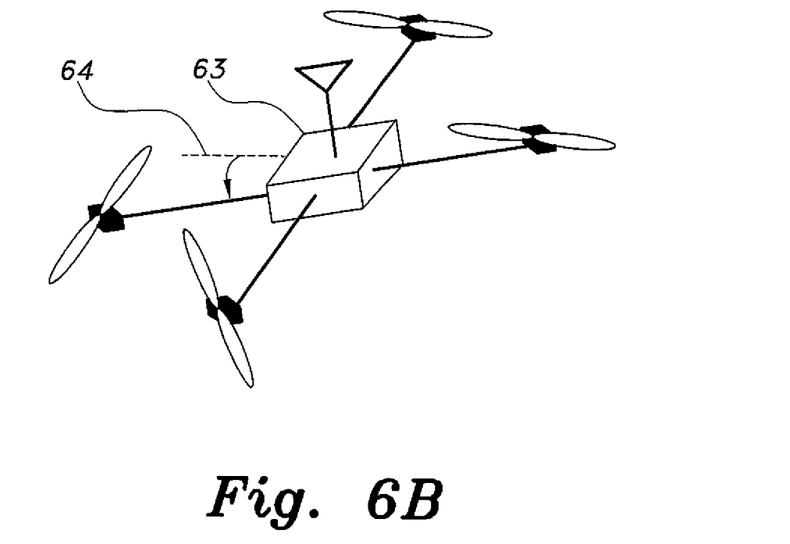
FIG. 6B shows a second orientation of the robotic antenna in a single-antenna direction finding system for multi-rotor platforms according to the present invention.
Figure 6C:
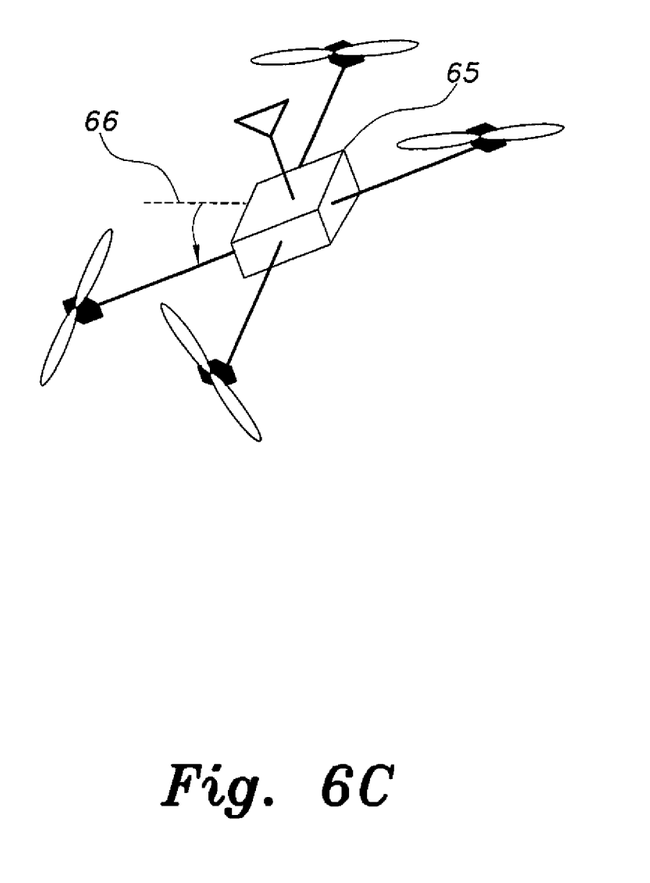
FIG. 6C shows a third orientation of the robotic antenna in a single-antenna direction finding system for multi-rotor platforms according to the present invention.

FIGS. 6A-6C show the scanning angles within the search mode of the DF algorithm. In FIG. 6A, the first complete scan 62 of 360° in the azimuth (yaw) direction of the UAV allows the directive antenna to be rotated along the axis of the UAV. The received RF power levels are recorded within the DF electronics. In this scan, the UAV is at 0° pitch angle. Once a complete scan is performed, the control electronics 63 tilts the UAV 10° down in elevation (pitch angle) 64, as in FIG. 6B, and a complete scan in 360° is performed, where the received power levels of the incoming signal as a function of the yaw direction are logged. A third pitch angle at 20° is then achieved via the control electronics 65 (FIG. 6C) of the UAV, and a third complete scan of the received power levels is performed. Then, based on the logged power level data, the relative location of the RF source is computed. The resulting pitch angle-yaw angle combination is used as the new path for the UAV, and thus this location is communicated with the control electronics to alter the movement of the UAV towards this new direction. The coordinate system of the UAV movement is shown at 61 in FIG. 6A.

Figure 7:
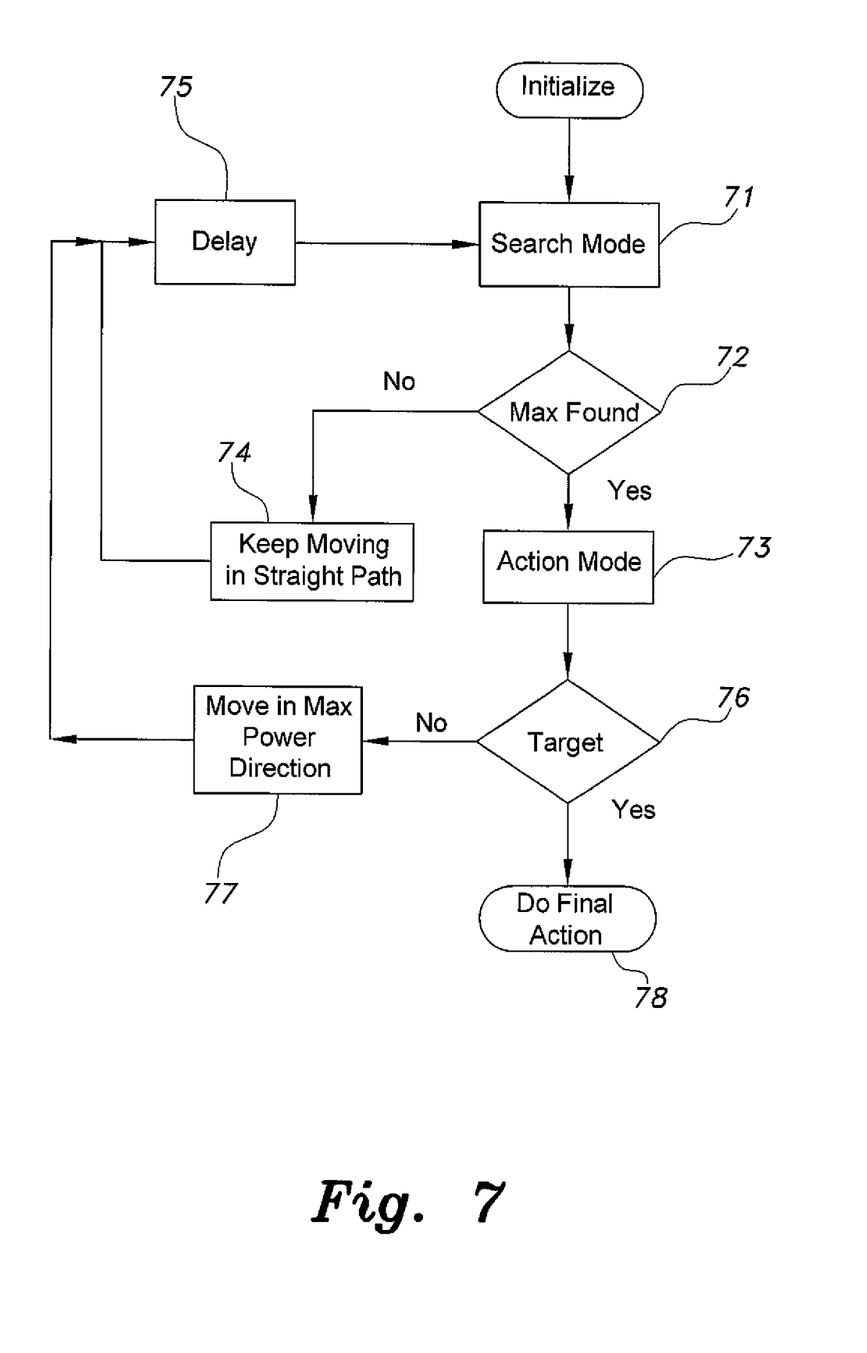
FIG. 7 is a flowchart for a single-antenna direction finding system for multi-rotor platforms according to the present invention, showing mode control of the robotic antenna.

A flowchart of the DF algorithm is shown in FIG. 7. Once the platform is initialized, it automatically enters the search mode at step 71. The three pitch angle readings for the 360° yaw angles are recorded and compared. If a clear maximum is found at step 72, then the system proceeds into action mode at step 73. If no distinctive peak in the recorded power levels is achieved (i.e., all recorded power levels are within 1 dB from one another), then the UAV will keep moving straight at step 74, and after some pre-defined delay at step 75, it enters the search mode again. If the action mode was chosen at step 73, the platform will change its direction and move towards the location of the received RF signal. If the goal is achieved (i.e., the target is reached), the UAV will perform its intended mission task at step 78, i.e., take a picture, deploy a material, etc. If it did not yet reach its target, while moving towards the target at step 77, and after some pre-defined delay at step 75, it enters search mode 71 again, in case the source location of the RF signal has moved.

Figure 8:
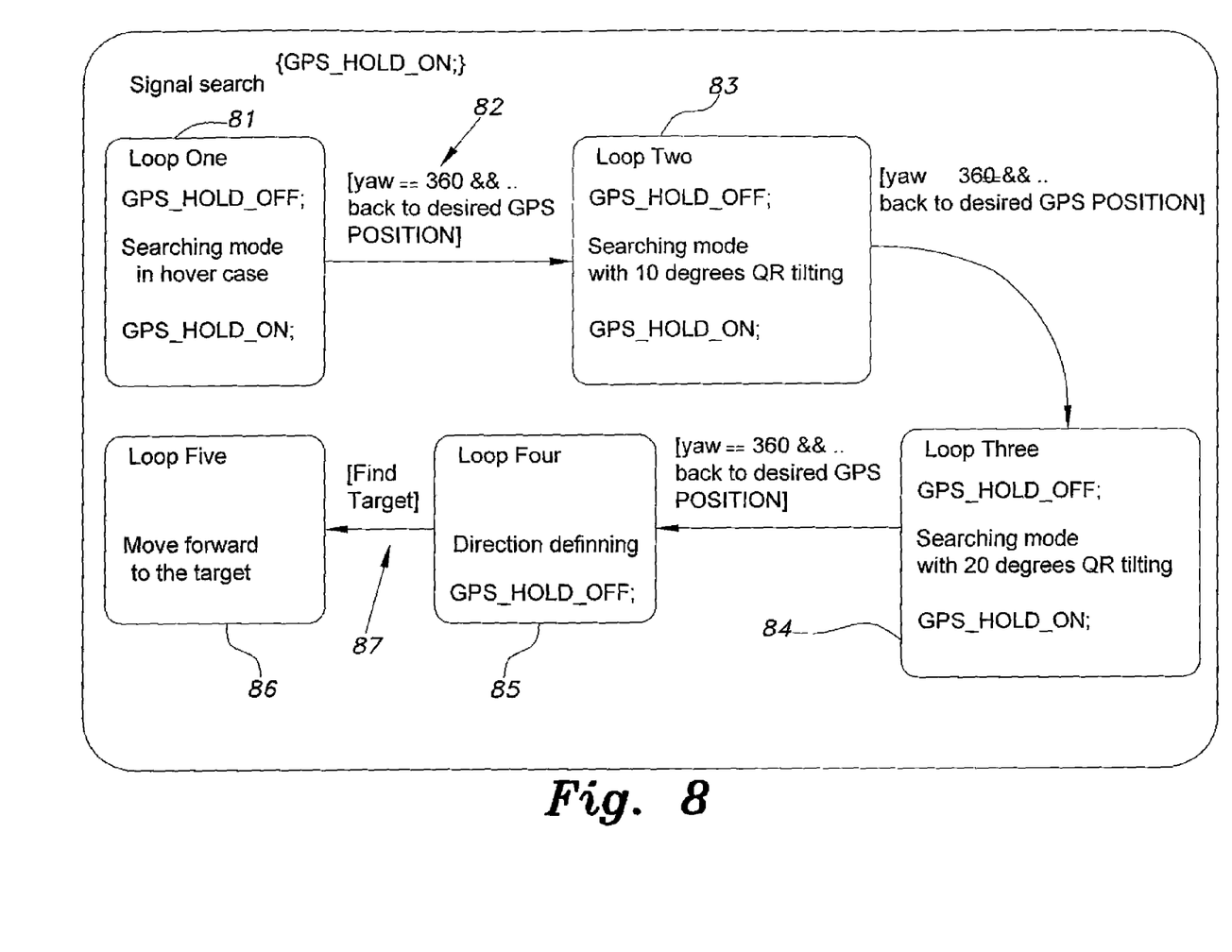
FIG. 8 is a block diagram showing the State Flow of the Search Mode Algorithm of the robotic antenna in a single-antenna direction finding system for multi-rotor platforms according to the present invention.

FIG. 8 illustrates the search mode algorithm. The diagram shows the state flow diagram of the sequence of signal direction finding using the quad-rotor UAV platform. In state one 81, the GPS hold mode is switched OFF, then the quad-rotor rotates around the z axis 360° with a 0° tilt. During the rotation, the UAV will sample the signal strength levels. Upon completion of this step, the GPS hold mode is switched ON to put the quad-rotor back to its original position in case of any external disturbances that may cause a drift in its x, y location. After completing this processing stage, the condition 82 is tested to make sure that the 360° yaw rotation is complete and the UAV is back to its original GPS location. If the condition 82 is satisfied, the algorithm moves to the second stage. The second state 83 will pitch 10° down and repeat what has been done in the first stage 81. In state three 84, the vehicle will tilt pitch another 10° and scan 360° after making sure that the condition is met. State four 85 determines the direction of the signal. The condition 87 is tested to make sure that the direction is defined correctly, and state five 86 commands the quad-rotor to move forward towards the RF source.

It is to be understood that the present invention is not limited to the embodiments described above, but encompasses any and all embodiments within the scope of the following claims.

We claim:

1. A single-antenna direction finding system for multi-rotor platforms, comprising:
   a UAV having multiple rotors, the multiple rotors changing attitude, speed, and direction of the UAV;
   a direction finding antenna fixed to the UAV;
   control circuitry operably connected to the multiple rotors, the control circuitry maintaining a desired pitch roll and yaw of the UAV;
   a direction finding (DF) processor onboard the UAV, the DF processor being operably connected to the control circuitry, the DF processor including:
   a DF receiver connected to the DF antenna;
   means for controlling the UAV to determine an azimuth of maximum signal strength of a signal received by the DF receiver;

means for controlling the UAV to determine an elevation of maximum signal strength of a signal received by the DF receiver; and means for controlling propulsion of the UAV along the azimuth and elevation of maximum signal strength towards the signal received by the DF receiver.

2. The single-antenna direction finding system according to claim 1, wherein said direction finding antenna is a four-element, planar microstrip having a high planar gain and a substantially narrow half power bandwidth.

3. The single-antenna direction finding system according to claim 2, wherein said direction finding antenna further comprises:

a printed circuit board having a top layer, a middle layer, and a bottom layer;

a dielectric substrate disposed on the top layer of the printed circuit board;

printed patch elements forming said four element, planar microstrip, the printed patch elements being disposed on the dielectric substrate;

a metal ground plane disposed on the middle layer of the printed circuit board;

a feed network placed on the bottom layer of the printed circuit board;

conductive elements extending from the bottom layer to the top layer to feed the patch elements in a probe-feed mechanism; and a four-port RF combiner circuit, the four ports being connected to conductive elements, the four-port combiner circuit having an output signal feeding said DF receiver.

4. The single-antenna direction finding system according to claim 3, wherein said patch elements are configured to provide a 3D gain pattern having an XZ plane half-power bandwidth of about 55° at an azimuth of 0°, and an XZ plane half-power bandwidth of about 60° at an azimuth of 90°.

5. The single-antenna direction finding system according to claim 4, wherein said means for controlling the UAV further comprises PID controllers having:

means for accepting commands from a ground station;

means for accepting feedback states from sensors onboard the UAV; and wherein the PID controllers output roll, pitch, yaw, and altitude correction signals to adjust speeds of said multiple rotors.

6. The single-antenna direction finding system according to claim 5, further comprising:

a navigation processor;

a GPS receiver operably connected to the navigation processor; and a switch operably connecting first pitch and roll angle commands from the ground station to said control circuitry, and, alternatively, second pitch and roll angle commands from the navigation processor to said control circuitry based on a signal searching mode of said DF processor.

7. The single-antenna direction finding system according to claim 6, wherein said DF processor further comprises:

means for completing a first signal scan in the azimuth direction at 0° pitch;

means for completing a second signal scan in the azimuth direction at −10° pitch;

means for completing a third signal scan in the azimuth direction at −20° pitch; and means for computing a relative location of a signal based on logged power level data from the first, second and third signal scans.

8. The single-antenna direction finding system according to claim 7, wherein said DF processor further comprises:

means for automatically entering the search mode after the UAV is initialized;

means for entering action mode when a clear maximum signal strength is found during the signal scans, the UAV being commanded to change its direction and move towards the location of the maximum strength signal;

means for performing an intended mission task when the UAV is a predetermined range from the maximum strength signal; and means for periodically re-entering the search mode to make path adjustments of the UAV based on changes in the strength of the signal.

* * * * *